United States Patent [19]
Kapaan et al.

[11] 4,419,816
[45] Dec. 13, 1983

[54] DEVICE FOR PRODUCING AN OBJECT CONSISTING OF AT LEAST TWO PARTS MOVABLE RELATIVE TO ONE ANOTHER ONE OF WHICH IS SUBSTANTIALLY ENCLOSED WITHIN THE OTHER

[75] Inventors: Hendrikus J. Kapaan, Nieuwegein; Martin B. Verburgh, Amersfoort, both of Netherlands

[73] Assignee: SKF Industrial Trading & Development Company B.V., Nieuwegein, Netherlands

[21] Appl. No.: 353,069

[22] Filed: Mar. 1, 1982

Related U.S. Application Data

[62] Division of Ser. No. 98,535, Nov. 29, 1979, Pat. No. 4,330,911.

[30] Foreign Application Priority Data

Nov. 27, 1978 [NL] Netherlands ............... 7811624

[51] Int. Cl.³ .................................... B21D 53/10
[52] U.S. Cl. .................................... 29/724
[58] Field of Search ............... 29/724, 725; 219/125.11, 121 EM, 121 LM, 121 P, 121 L, 7.5, 59.1, 61.1, 10.43, 10.57, 10.55 M, 61.2; 308/177

[56] References Cited

U.S. PATENT DOCUMENTS

| 1,748,973 | 3/1930 | Buckwalter | 29/724 |
| 3,704,498 | 12/1972 | Rundt | 29/148.4 A |
| 3,729,789 | 5/1973 | Otto | 29/724 |
| 3,830,633 | 12/1973 | Harbottle | 29/724 |

Primary Examiner—Howard N. Goldberg
Assistant Examiner—V. K. Rising
Attorney, Agent, or Firm—Eugene E. Renz, Jr.

[57] ABSTRACT

A device for assembling a bearing comprising an outer race ring, at least a pair of separate inner race rings, a plurality of rolling elements in the annular space between the race rings and an opening extending radially in the outer race ring aligned with the parting line of the inner rings comprising a rotatable spindle provided with guiding or centering means, a shoulder, and a hollow member capable of being slipped over the free end of the spindle and having a skirt embracing the spindle with clearance so that the inner race pieces of the bearing to be produced are clamped between the shoulder of the spindle and the head of the hollow member, means acting on the free end of the spindle being provided to press the hollow member against the inner race pieces, while means for holding the outer race stationary and means for generating a high energy welding beam are provided.

3 Claims, 3 Drawing Figures

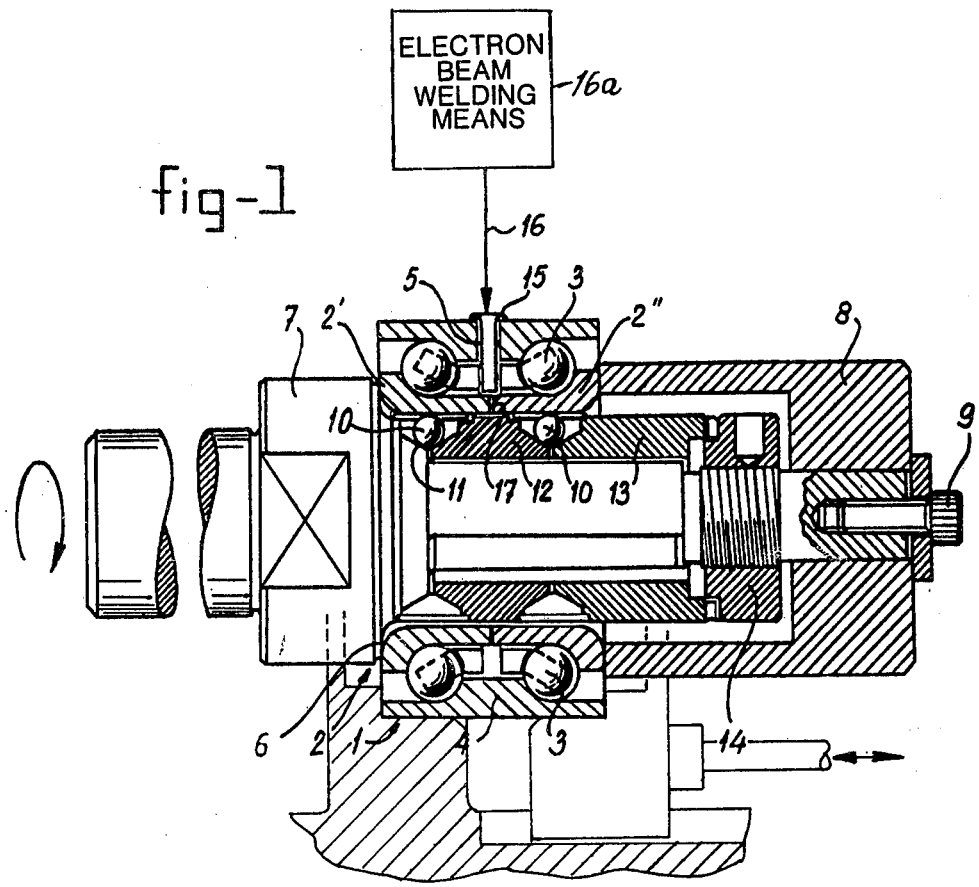
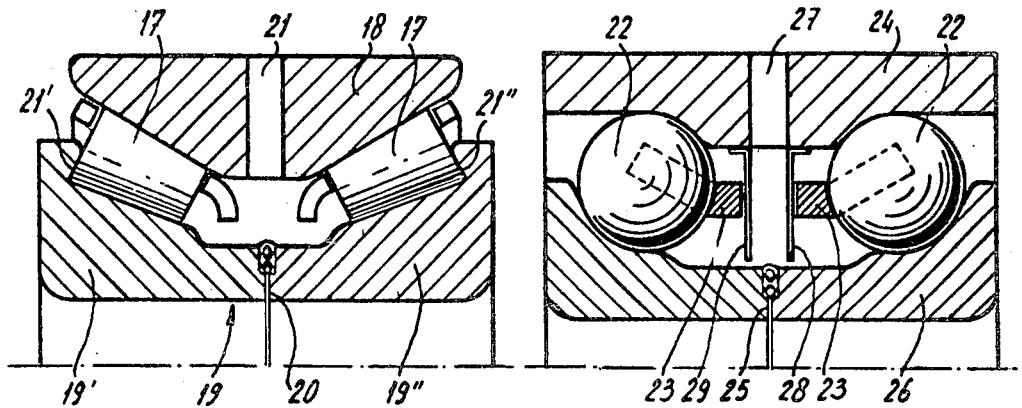

DEVICE FOR PRODUCING AN OBJECT CONSISTING OF AT LEAST TWO PARTS MOVABLE RELATIVE TO ONE ANOTHER ONE OF WHICH IS SUBSTANTIALLY ENCLOSED WITHIN THE OTHER

BACKGROUND AND SUMMARY OF THE INVENTION

This application is a division of Ser. No. 98,535, filed Nov. 29, 1979, now U.S. Pat. No. 4,330,911.

The invention relates to a process for production of an object consisting of at least two parts movable relative to each other, one of which or a portion thereof is substantially enclosed within the other.

Specifically, the invention is addressed to a process for production of such an object wherein one or more loose members are enclosed between the two parts of the object.

In the production of such objects, the placement of the members between the parts presents a difficult problem.

This problem has now been solved by making one of the parts in at least two separate pieces, placing these pieces against each other and holding them in the correct position in relation to the other part, setting up a high energy beam welding means such as a laser or electron beam over the parting line between the two pieces, and putting it in operation, at least the said two pieces being moved bodily in order to move the parting line along the energy beam and weld the two pieces together, the members being emplaced at the time of moving the two pieces of the one part together into the correct position in relation to the other part.

German Letters of Disclosure No. 2,712,539 do disclose a process for production of a self-aligning friction bearing consisting of a sleeve having a spherical outer surface inside an annular casing with a matching spherical inner surface, the casing being composed of two pieces which are welded to each other around the sleeve by means of a stationary electron beam welding means aimed at the parting line between the said two pieces, the sleve and the casing being rotated bodily together.

In particular, the process according to the invention may be applied to the production of objects the parts of which are annular, like sealing rings or races of antifriction bearings, the one part being made in two pieces such that the parting line lies in a plane perpendicular to the axis of rotation of the ring. The part made in two pieces may be the inner part, in which case the outer part is provided with an opening passing radially through it and located over the parting line in assembled condition, while the high energy beam welding means is placed over the outer end of the opening so that the energy beam reaches the parting line through the opening, and the two pieces of the inner part are bodily set in rotation together while the outer part is held stationary.

This latter form of the process according to the invention is especially advantageous for the production of antifriction bearings having two rows of rolling members, in which case the innermost race, constituting the inner part, is made in two pieces such that the parting line is located between the rows, so that then the inner race may be made in two parts that when these parts are brought up against each other, a prestress is applied to the rolling members.

In order to prevent spatters from sticking between the parts during the welding, and/or damage from being done by the heat of the energy beam, a small tube may be arranged in the opening in the other part, its bottom end extending to above the parting line. Preferably the tube, which is removable, consists of a material capable of catching and retaining spatters that occur during welding.

Alternatively, on opposed sides of the opening in the outermost part, two annular discs substantially parallel to each other may be attached by their outer peripheries to the inner surface of the outermost part, the inner peripheries of these discs being located on opposed sides of the parting line, over the outer surface of the innermost part. In this way, support may also be provided for the cages.

By the process according to the invention, it is in particular a very simple matter to produce an antifriction bearing, which bearing may be a full prestressed bearing unit, so that locking means such as a ring with lock nut may be dispensed with. Furthermore, a bearing with tapered rolling members may be obtained in which the inner race is provided with outer shoulders only, thus eliminating the machining required to make the inner shoulders.

DESCRIPTION OF THE DRAWING

The process according to the invention will be described in more detail in reference to FIG. 1 of the drawing, showing a longitudinal section of a fixture for producing an antifriction bearing by the process according to the invention;

FIG. 2 is an enlarged transverse section through the bearing;

FIG. 3 is a transverse section similar to FIG. 2 in another embodiment.

DESCRIPTION OF PREFERRED EMBODIMENT

As shown in FIG. 1, in building an antifriction bearing 1, the inner race 2 is made in two pieces 2' and 2", which pieces together with the rolling members 3 are placed in the correct position inside the outer race 4, which outer race 4 is provided with an opening 5, whereupon the pieces 2' and 2" are clamped between the shoulder 6 of a spindle 7 and a cup 8. By means of the screw 9, some prestress can be applied to the rolling members 3. The inner race pieces 2' and 2" are supported by balls 10 lying in channels formed between a shoulder 11 of the spindle and a sleeve 12 and an adjacent sleeve 13, which sleeves 12 and 13 are held in place by nut 14.

After the parts of the bearing 1 have thus been assembled, a tube 15 is inserted in the opening 5 of the outer race 4, and an electron beam welding means 16a is set up over the tube 15, so that the electron beam, indicated by the arrow 16, can reach the parting 17 between the inner race pieces 2' and 2" through the tube 15. Then the spindle 7 is set in rotation, while holding the outer race 4 stationary in a support frame 16b, so that the parting 17 is moved along past the electron beam 16 and the inner race pieces 2' and 2" are welded together.

FIG. 2 of the drawing shows a fully prestressed antifriction bearing produced according to the invention, having two rows of tapered rolling members 17 located between the outer race 18 and the inner race 19. The inner race is made in two pieces 19' and 19" connected together by a weld 20, and these pieces are provided respectively with outer shoulders 21' and 21" only. An opening 21 is arranged in the outer race 18.

FIG. 3 of the drawing shows an antifriction bearing produced according to the invention, having two rows of balls 22 in cages 23 between the outer race 24 and the inner race 26, the latter made in two pieces connected together by a weld 25. An opening 27 is arranged in the outer race 24, and on opposed sides of this opening 27, two annular discs 28 and 29 are attached to the inside of the outer race 24. These discs 28 and 29 provide support for the cages 23 as well.

What is claimed is:

1. A device for assembling a bearing having an outer race ring, at least a pair of separate inner side by side race rings defining therebetween a parting line, a plurality of rolling elements in the annular space between the inner and outer race rings and a radially extending opening in the outer race ring aligned with the parting line of the inner rings comprising means for supporting the bearing elements to rotate the inner rings and maintain the outer rings stationary including a rotatable spindle having a guide or centering means engageable in the bore of the inner rings and a circumferential radial extending shoulder adapted to engage the axial end face of one said inner race rings, a cup member engageable over the free end of the spindle and engageable with the outer axial end face of the other inner race ring and means for adjusting the cup member axially thereby to clamp the inner race rings between the shoulder of the spindle and the cup member and electron beam welding means positioned to direct an electron beam through the opening in the outer race ring whereby upon rotation of said spindle and said inner race rings, the inner race rings are joined by welding at said parting line.

2. A device as claimed in claim 1 including a pair of sleve members engageable over said spindle having a circumferentially extending channel formed between the sleeves and another channel formed between one of the sleeves and a shoulder on the spindle, and a plurality of balls in the channels supporting said inner race rings.

3. A device as claimed in claim 1 including a screw member adjustably engageable in the spindle and cooperative with the cup member providing means for axially adjusting the spindle and cup member relative to one another and thereby prestressing the rolling elements.

* * * * *